W. B. THOMAS.
STEERING DEVICE FOR MOTOR VEHICLES
APPLICATION FILED MAR. 30, 1920.
1,425,723.
Patented Aug. 15, 1922.
3 SHEETS—SHEET 1.
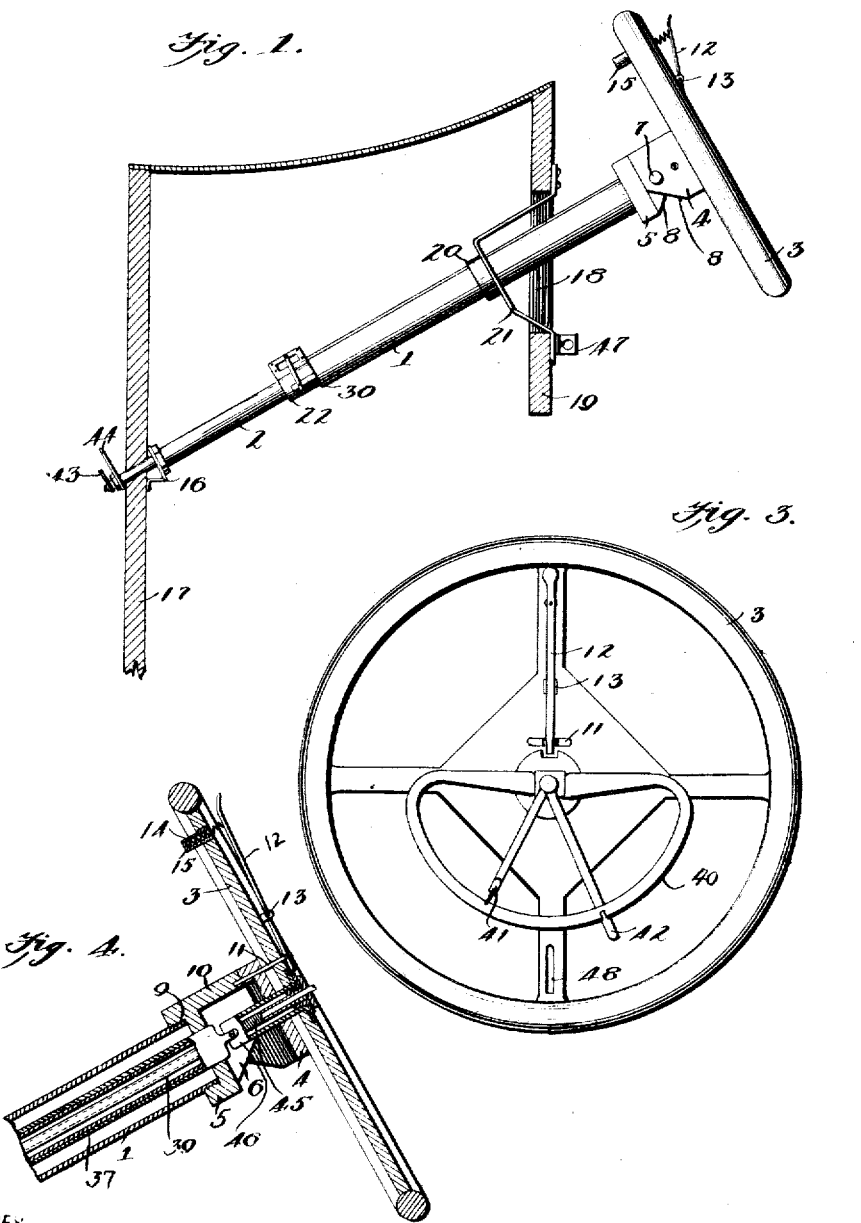

W. B. THOMAS.
STEERING DEVICE FOR MOTOR VEHICLES.
APPLICATION FILED MAR. 30, 1920.
1,425,723.
Patented Aug. 15, 1922.
3 SHEETS—SHEET 2.
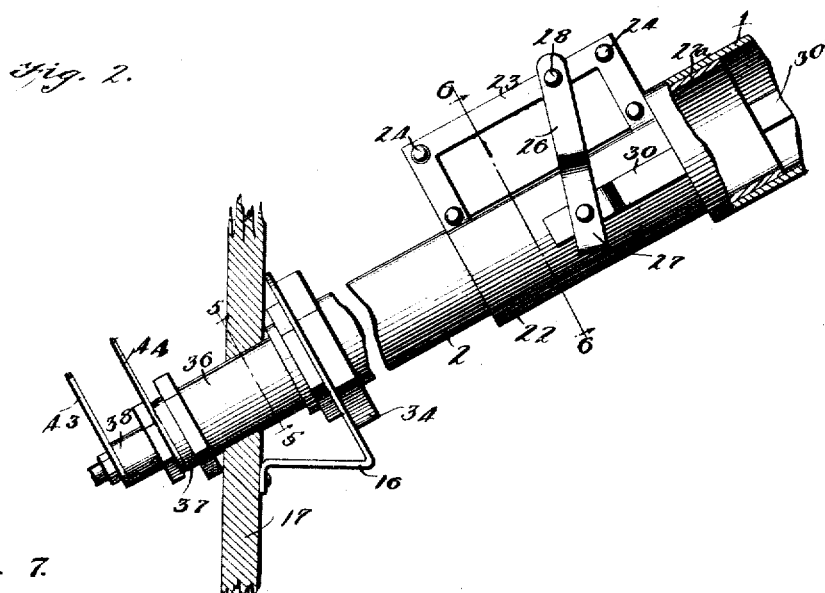
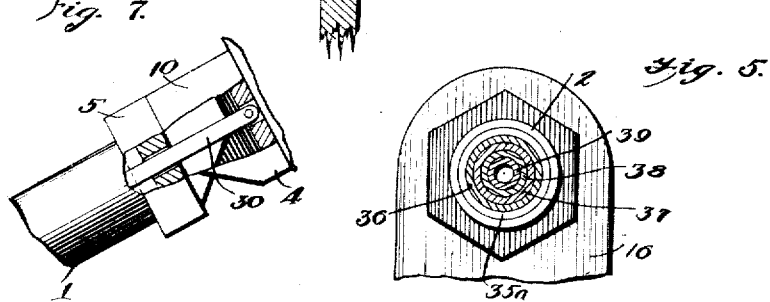
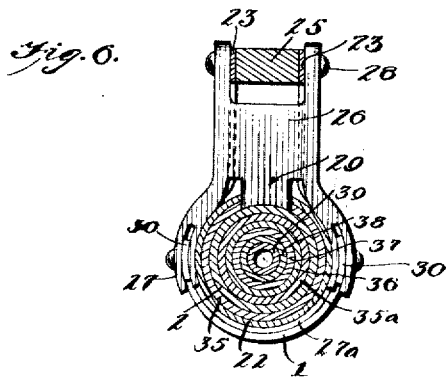
WITNESSES
INVENTOR
W. B. Thomas,
BY
ATTORNEYS W. B. THOMAS.
STEERING DEVICE FOR MOTOR VEHICLES.
APPLICATION FILED MAR. 30, 1920.
1,425,723.
Patented Aug. 15, 1922.
3 SHEETS—SHEET 3.
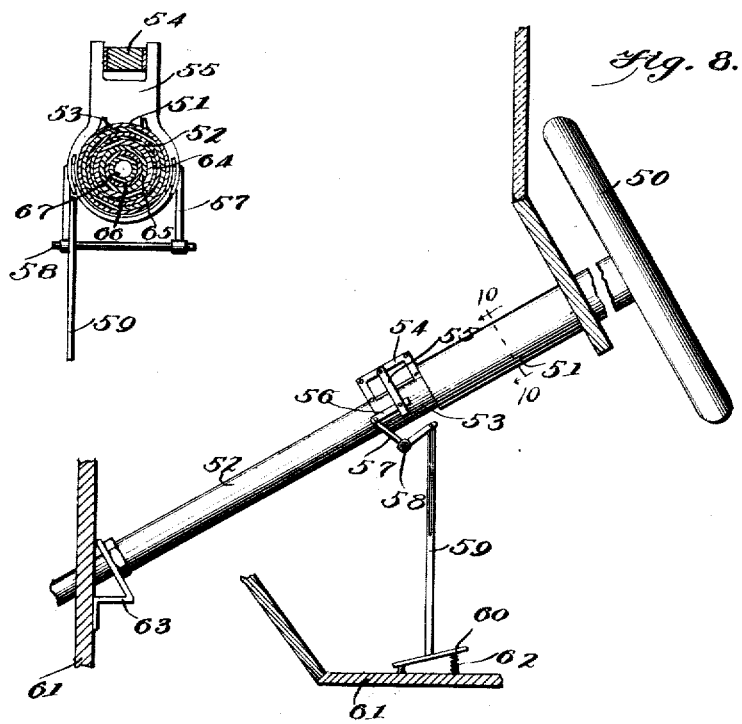
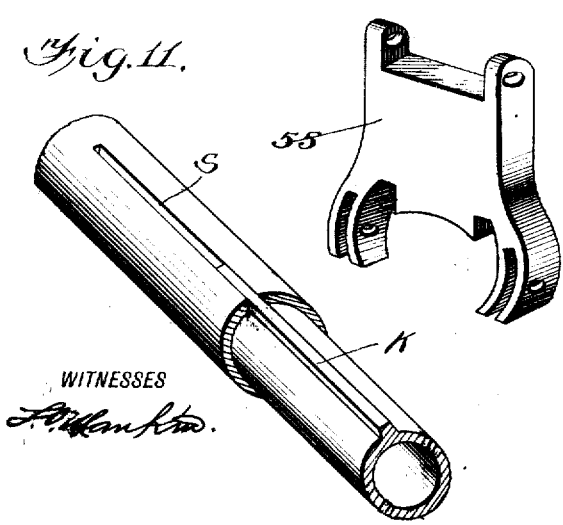
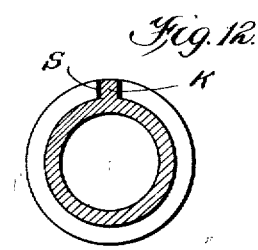
INVENTOR
W. B. THOMAS
ATTORNEYS

UNITED STATES PATENT OFFICE.

WILLIAM BAILEY THOMAS, OF JACKSONVILLE, FLORIDA.

STEERING DEVICE FOR MOTOR VEHICLES.

1,425,723.     Specification of Letters Patent.     Patented Aug. 15, 1922.

Application filed March 30, 1920. Serial No. 369,916.

*To all whom it may concern:*

Be it known that I, WILLIAM BAILEY THOMAS, a citizen of the United States, and a resident of Jacksonville, in the county of Duval and State of Florida, have invented certain new and useful Improvements in Steering Devices for Motor Vehicles, of which the following is a specification.

My invention is an improvement in steering devices for motor vehicles, and the invention has for its object to provide a steering device wherein the steering column is collapsible and hollow, and the controlling devices for the motor are also collapsible and are arranged within the column and connected to the steering wheel to be collapsed with the column, and wherein the steering wheel is hinged to the column, to swing into a plane transverse to the axis of the shaft, and inclined with respect thereto, and wherein releasing mechanism is provided for holding the column extended and controlled by the swinging of the steering wheel.

In the drawings:—

Figure 1 is a sectional view of the dashboard of a motor vehicle provided with the improved steering device, and showing the post extended, Figure 2 is an enlarged view showing the holding mechanism for the post, Figure 3 is a front view of the wheel, Figure 4 is an enlarged section taken at the upper end of the post, Figures 5 and 6 are sections on the lines 5—5 and 6—6, respectively of Figure 2.

Figure 7 is a sectional view showing the connection between the wheel and the brake mechanism.

Figure 8 is a side view showing another embodiment of the invention,

Figure 9 is a perspective view of the brake lever,

Figure 10 is a section on the line 10—10 of Figure 8.

Figure 11 is a fragmentary detail perspective view, illustrating one mode of splining the sections of the telescopic shafts to each other; and Figure 12 is a similar view in transverse section.

In the present embodiment of the invention, the steering column is composed of an outer section 1 and an inner section 2, which is slidable within the outer section. The steering wheel 3 has at the hub thereof a species of casing 4, which is hinged to a head 5 mounted on the section 1 of the steering column.

Referring to Figure 4, it will be seen that the head 5 has lugs 6 extending toward the steering wheel, and each of these lugs has an outwardly extending journal pin 7 which is received within an opening in the adjacent side wall of the casing 4. This casing 4 is open at its underside and at its outer end, and the side walls are beveled as shown at 8, at the lower outer corners.

The head 5 has a central recess 9 which is internally threaded, and which engages the section 1 of the steering column, and the lugs 6 are connected at the upper side of the column by a transversely extending web 10. In order to normally hold the steering wheel transverse to the axis of the steering column, a locking pin 11 is provided, which is mounted to slide through an opening in the hub, and through an opening in the casing, into engagement with the web 10 before mentioned, the locking pin having a substantial lateral as well as longitudinal extent so that when it is engaged with its seat it will prevent movement of the steering wheel until it is released.

This pin is connected at its outer end to one end of a lever 12 which is pivoted intermediate its ends as shown at 13 to the hub of the steering wheel. The outer end of the lever is engaged by a spring 14, which is seated in a casing 15 in the form of a nipple, which is threaded into an opening in one of the spokes, the nipple having the end adjacent to the lever, open.

The spring acts normally to seat the locking pin, and by pressing down on the outer end of the lever, the locking pin may be released. When so released, the wheel may be swung with its plane inclined to the axis of the steering column.

The section 2 of the steering column is fixed, being held by a bracket 16 secured to the body 17 of the vehicle, and the section 1 is slidable thereon, sliding through an opening 18 in the dash board 19, and through a collar 20 held by a bracket 21 secured to the dash board at the opening. This section 1 is normally held from movement downward on the section 2 by means of a brake.

A sleeve 22 is held at the lower end of the section 1, the upper end of the sleeve fitting within the lower end of the section 1. This sleeve is a split sleeve having extensions 23 at the sides of the split, and the split is at the upper side of the steering column. Each of these extensions is an open substantially rectangular frame, and rivets 24 connect these extensions on the opposite sides of a block 25 which is arranged between the outer ends of the extensions.

A yoke shaped lever comprising a body 26 and arms 27 is supported by a bolt 28 which is passed through the block and the extensions near the upper ends thereof, as clearly shown in Figure 2. The body 26 of the lever carries a brake shoe 29 in the present instance, an integral extension of the body, and this brake shoe is adapted to engage the section 2 of the steering column at the split.

The body of the yoke is slightly longer than the distance between the bolt 28 and the periphery of the section 2 at the nearest point thereof, and the lever normally lies slightly inclined. Links 30 are pivoted to the arms 27 of the yoke, the said arms being slotted as shown in Figure 6 to receive the links, and at the upper ends the links are connected with the casing 4, and they are mounted to slide at their upper ends through the head 5.

A spacing member 27ᵃ is arranged between the sleeve and the section 1, and this spacing member is cut away at the links 30 to permit the passage of the said links. In the operation of this part of the construction, when it is desired to collapse the steering column, the lever 12 is moved against the resistance of the spring 14, releasing the locking pin 11. The wheel is now swung down until it is substantially parallel with the dash board 19. This swinging movement of the wheel increases the inclination of the yoke 26 with respect to the axis of the steering column, and releases the brake shoe 29 from the section 2.

The weight of the steering wheel and of the section 1, collapses the steering column, the section 1 sliding down upon the section 2 until it engages the nut 34 at the bracket 16. When this engagement has taken place, the elements 4 and 5 will pass through the opening 18 into engagement with the bracket 21, and the steering wheel will be flat against the face of the dash board.

The sleeve 22 is lined as shown at 35 in Figure 6, and controlling shafts for the ignition and for the throttle valves are arranged within the steering post, said shafts being sectional and telescoping. These shafts consist of sections 36—37 and 38—39, the sections 36 and 38 being the outer sections, while the sections 37 and 39 are the inner sections.

Each of the sections 36 and 38 has connected to the lower end thereof, a radial arm 43 and 44 respectively, and these arms are connected with the ignition and with the throttle valve respectively. The section 39 has at its upper end a flexible portion 45 which is at the joint between the casing 4 and the head 5, and at this point the section 37 is pivoted to an inwardly extending nipple 46 on the wheel. The wheel has an arcuate shaped bar 40 secured thereto, and controlling arms 41 and 42 are connected with the sections 37 and 39—respectively, at the bar 40.

The controlling arm 41 is connected with the nipple 45 which is rotatable with respect to the wheel, and the arm 41 is connected to the end of the flexible portion 45 of the section 39. By means of these arms the ignition and the throttle valves may be controlled, and the connection between the throttle valve and the ignition and the controlling arms is telescoping or collapsing like that between the sections of the steering shaft. Means is provided for locking the wheel to the dash board, the said means consisting of a staple 47 on the dash board and a slot 48 in the wheel through which the staple is adapted to extend, and the shackle of a padlock may be engaged with the staple when the wheel is collapsed onto the dashboard.

In the embodiment of the invention shown in Figures 8, 9 and 10, the wheel 50 is rigid with the outer section 51 of the steering column which is mounted to slide over the inner section 52, in the same manner as shown in Figure 1. A split sleeve 53 which corresponds to the sleeve 22 of Figure 2, has the extension 54 to which is pivoted the yoke shaped lever 55 similar in all respects to the lever 26 of Figure 2.

Links 56 connect this lever to forwardly extending arms 57 on a shaft 58 journaled in a fixed support and having a rearwardly extending arm which is connected by a link 59 to a treadle 60 which is pivoted to the floor of the vehicle 61, and is normally pressed upward by a spring 62.

The steering column is supported at its lower end by a bracket 63 arranged on the foot board of the vehicle 61, in the same manner as the bracket 16 is arranged on the foot board 17.

The controlling shafts for the ignition and the throttle are sectional telescoping shafts consisting of inner and outer sections precisely like those shown in Figures 1 and 2. The controlling tubes consist of inner and outer sections 65—64 and 67—66, respectively.

The operation of the above described arrangement is as follows:

To lease the controlling shaft sections so that they may telescope with respect to each other, it is only necessary to press the treadle 60. This oscillates the shaft 58 in a direction to release the brake lever 55, and the wheel and the outer section of the steering shaft together with the outer sections of the controlling shafts move downwardly.

There is a lost motion connection between the link 59 and the rearwardly extending arm of the shaft 58, so that the link does not interfere with the sliding movement of the shaft sections. So long as the treadle is not depressed, the parts will be locked in their extended position.

It is to be understood of course that the telescopic sections which go to make up the various telescopic shafts are suitably held against relative rotary motion.

Preferably the sections which go to make up the telescopic shafts are splined to each other so as to be capable of partaking of relative longitudinal movement while held against relative rotary movement. Various modes of splining the shafts will suggest themselves to persons skilled in the art, and one conventional mode of effecting this is shown in Figures 11 and 12. As shown in these figures, one of the sections of each shaft is provided with a slot S which extends longitudinally thereof and which operatively receives a key K which is fixed to the other section of the shaft and which is entirely received within the slot S as clearly shown in Figure 12. Of course, it is to be understood that while this construction is shown for only one shaft it is identical in all of the shafts and therefore a disclosure of it as it is in one serves for all.

I claim:—

1. A steering device for motor vehicles, comprising in combination with a steering wheel, a steering shaft consisting of telescoping sections, the steering wheel being pivoted to the outermost section to swing transversely thereof or in a plane inclined to the long axis of the shaft, a split sleeve carried by one of said sections and slidable over the other of said sections, said sleeve having lateral extensions adjacent said split, a brake pivoted to the extensions of said sleeve and operable through the split of said sleeve to engage the other of said sections and having yoke arms, and links pivotally connected at one end to said yoke arms and at the other end to said steering wheel, whereby said steering wheel is adapted to control or operate said brake.

2. A steering device for motor vehicles comprising a steering shaft consisting of telescoping sections, a split sleeve carried by one of said sections and slidable over the other of said sections, said sleeve having lateral extensions adjacent said split, each consisting of a substantially open rectangular frame, a brake pivoted to the extensions of said sleeve and having a portion constituting a brake shoe operable through the split of said sleeve to engage the other of said sections, and having yoke arms extending through the open frames to the exterior of said sleeve, and operating means including links pivotally connected at one end to said yoke arms.

3. A steering device for motor vehicles, comprising a steering shaft consisting of telescoping sections, a split sleeve carried by one of said sections and slidable over the other of said sections, said sleeve having lateral extensions adjacent said split, a brake pivoted to the extensions of said sleeve and operable through the split of said sleeve to engage the other of said sections and having yoke arms, and operating means including links pivotally connected to said yoke arms.

4. In motor vehicles, the combination with the steering wheel, of a steering shaft consisting of telescoping sections, the wheel being pivoted to the outermost section to swing transversely thereof or in a plane inclined to the long axis of the shaft, sectional controlling shafts arranged one within the other and within the steering column, the shaft consisting of sections slidably connected and constrained to rotate together, controlling levers on the wheel connected with the controlling shafts to turn said shafts, and a hinged connection between each shaft and its lever for permitting the lever to swing with the wheel.

5. A steering device for motor vehicles, comprising in combination with a steering wheel a steering shaft consisting of telescoping sections, the wheel being pivoted to the outermost section to swing transversely thereof or in a plane inclined to the long axis of the shaft, a split sleeve carried by one of said sections and slidable over the other of said sections, a pivoted brake carried by the sleeve and operable through the split thereof to engage the other of said sections and having yoke arms extending to the exterior of said sleeve, and links pivotally connected at one end to said yoke arms and the other end to said steering wheel whereby said steering wheel controls or operates said brake.

WILLIAM BAILEY THOMAS.